Sept. 4, 1923.
J. N. TZIBIDES
1,467,019
MACHINE FOR HANDLING CIGARETTE PACKAGES OR THE LIKE
Filed Aug. 2, 1920
8 Sheets-Sheet 8
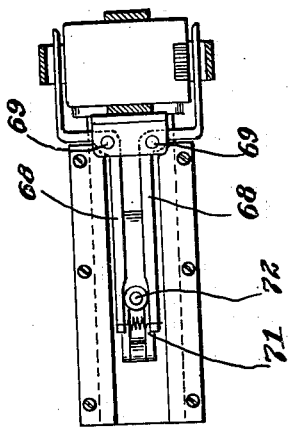
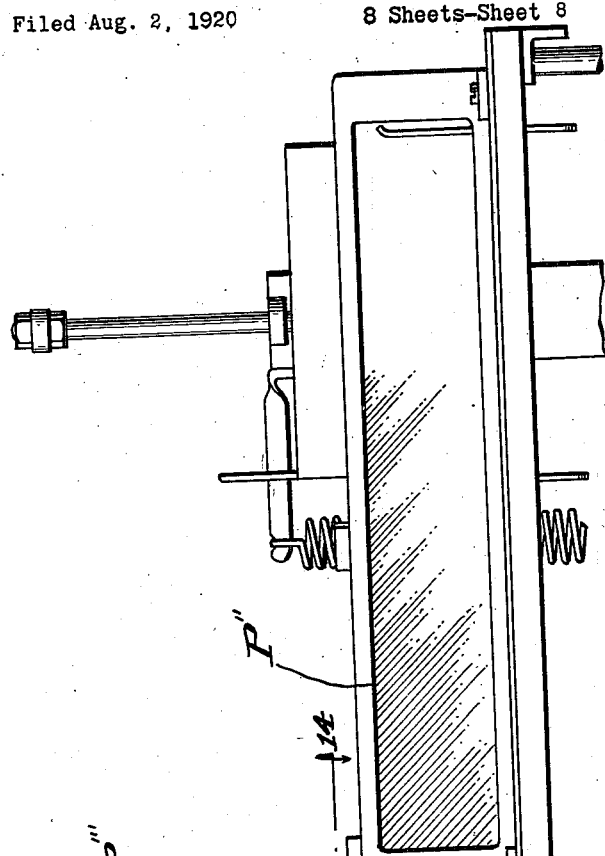
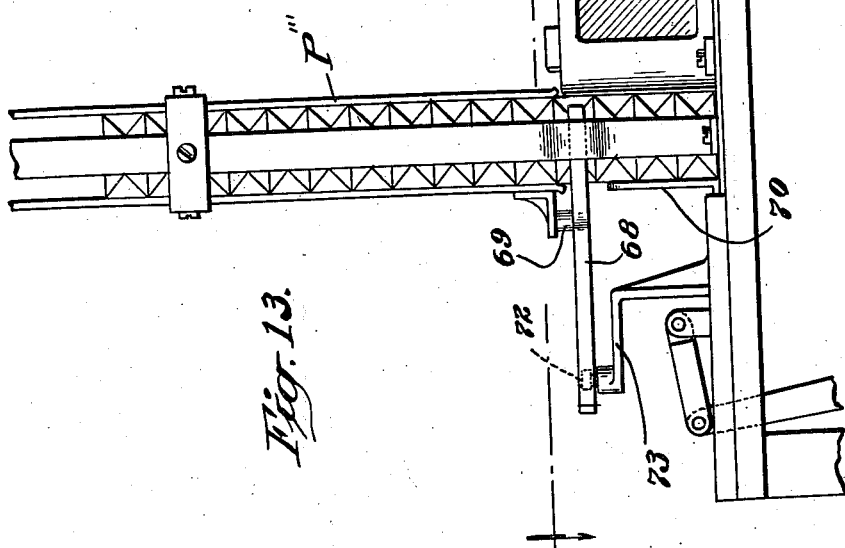
Inventor
James N. Tzibides
By his Attorneys
Roberts, Roberts & Cushman Patented Sept. 4, 1923.

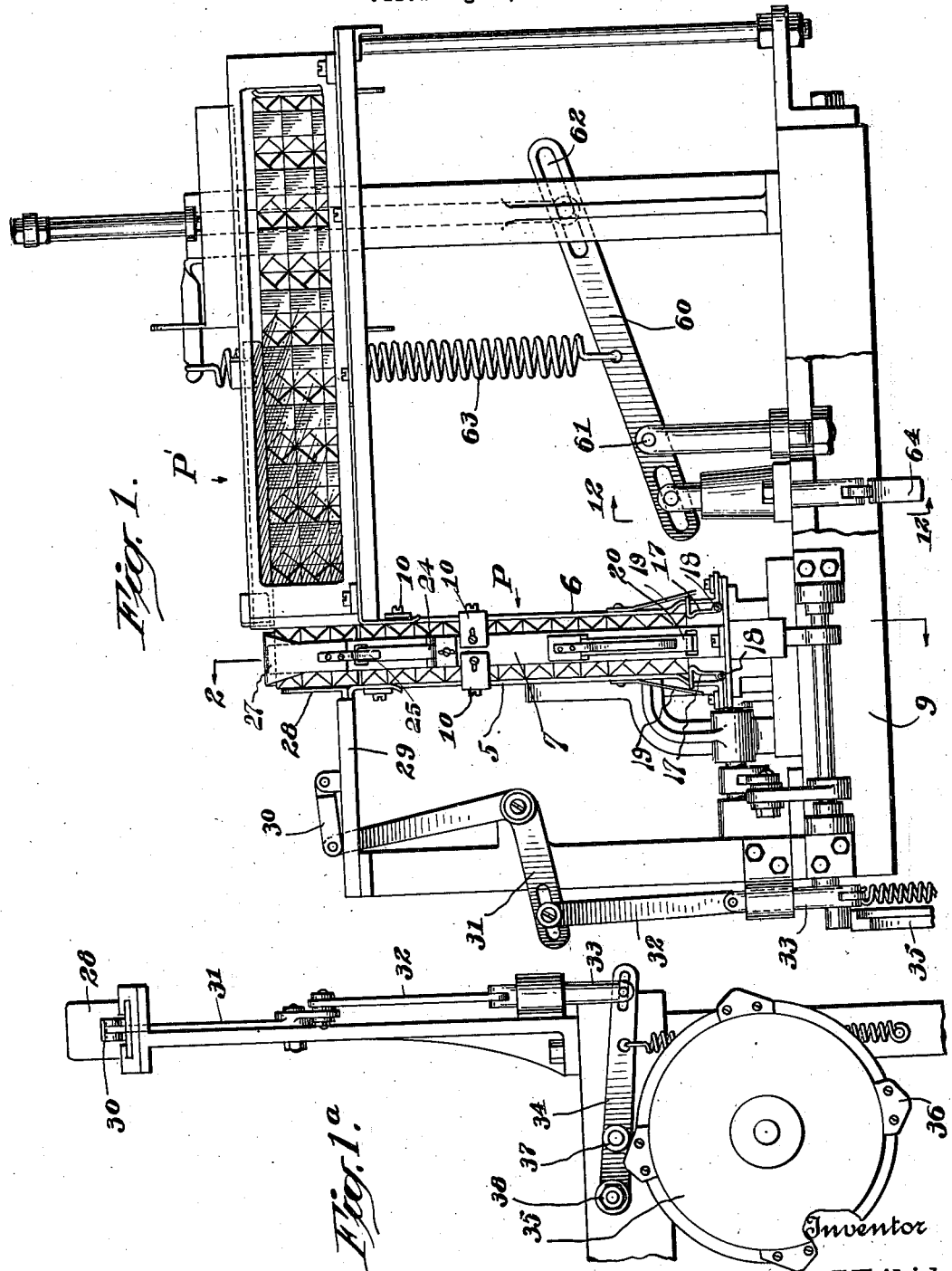

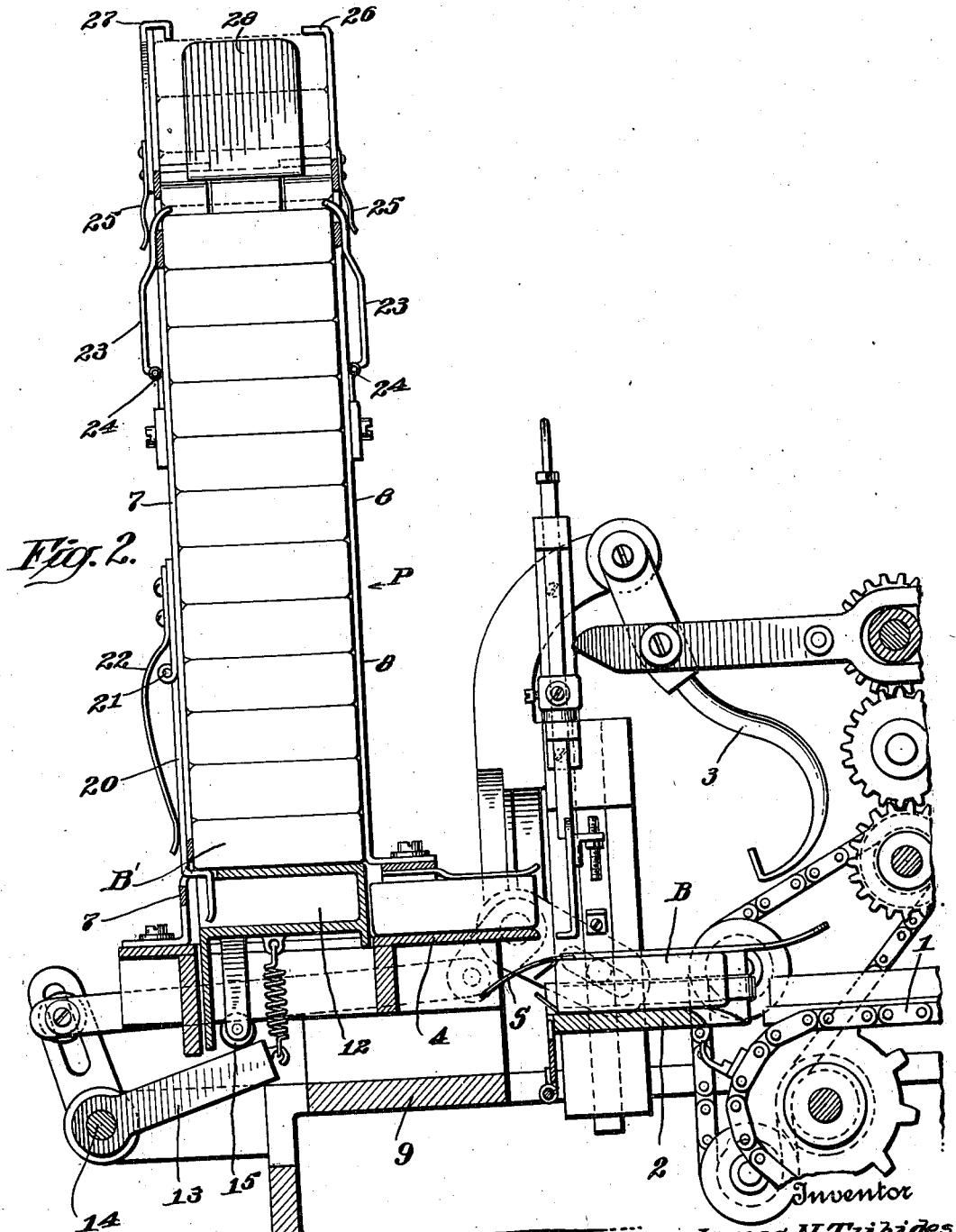

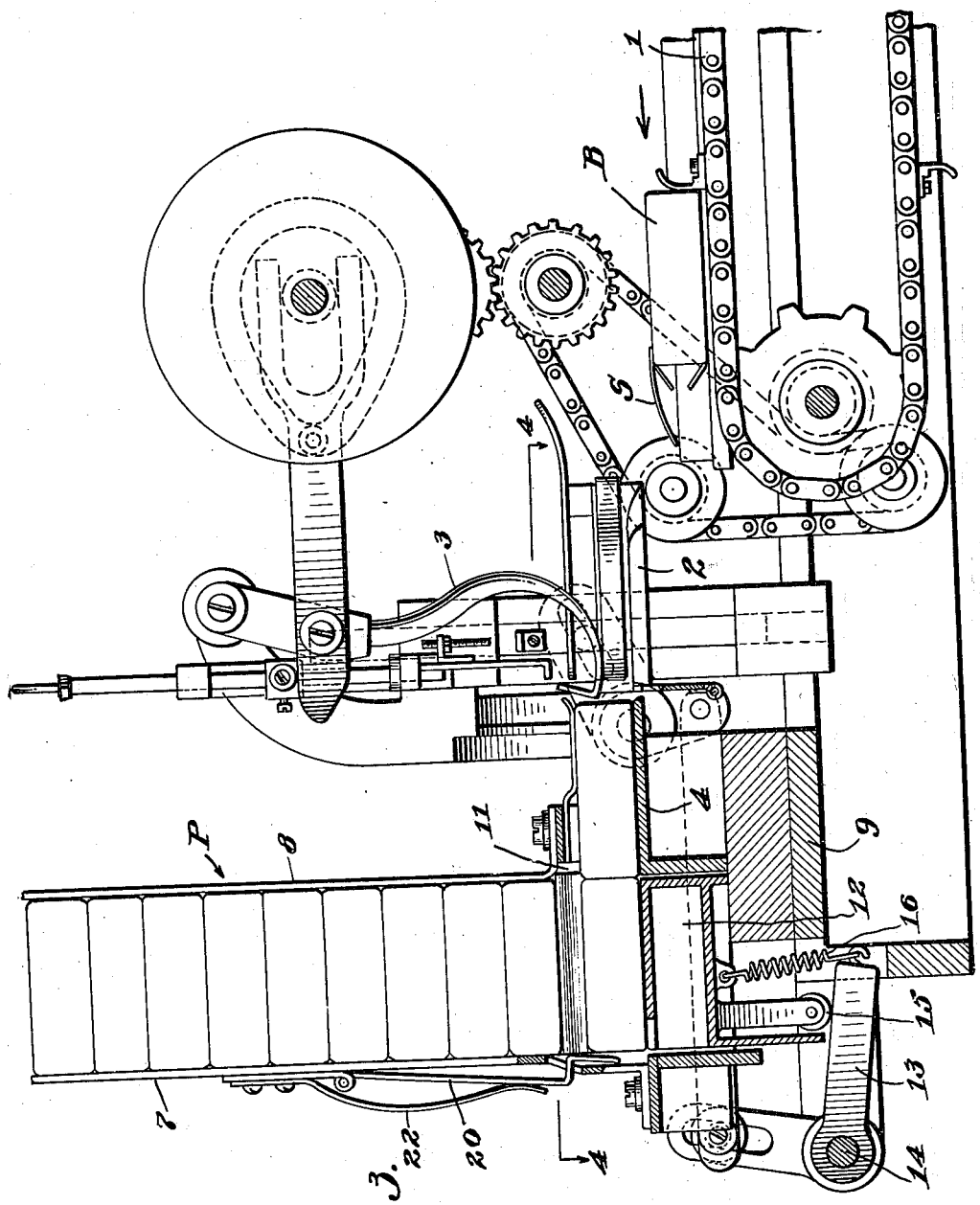

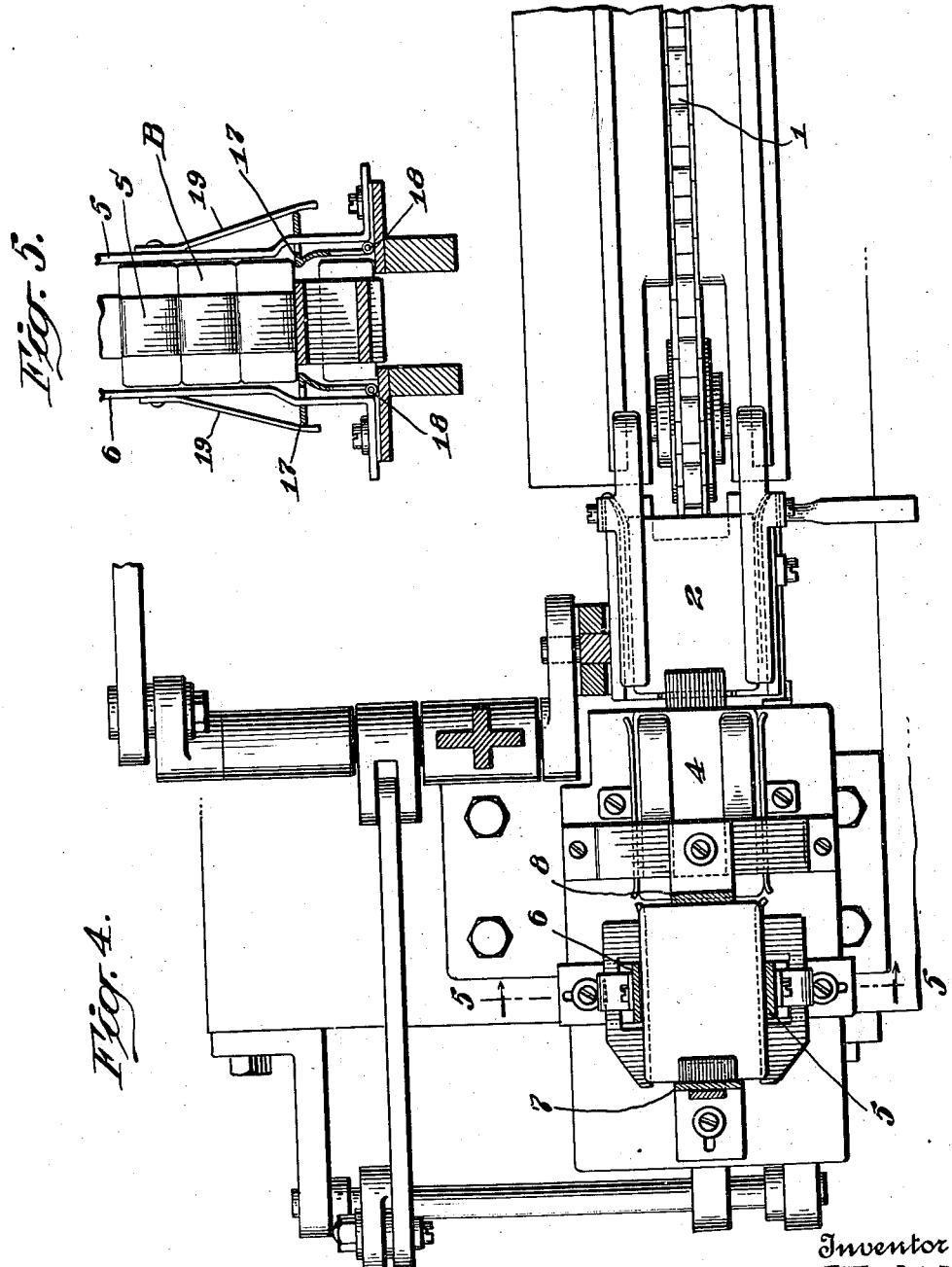

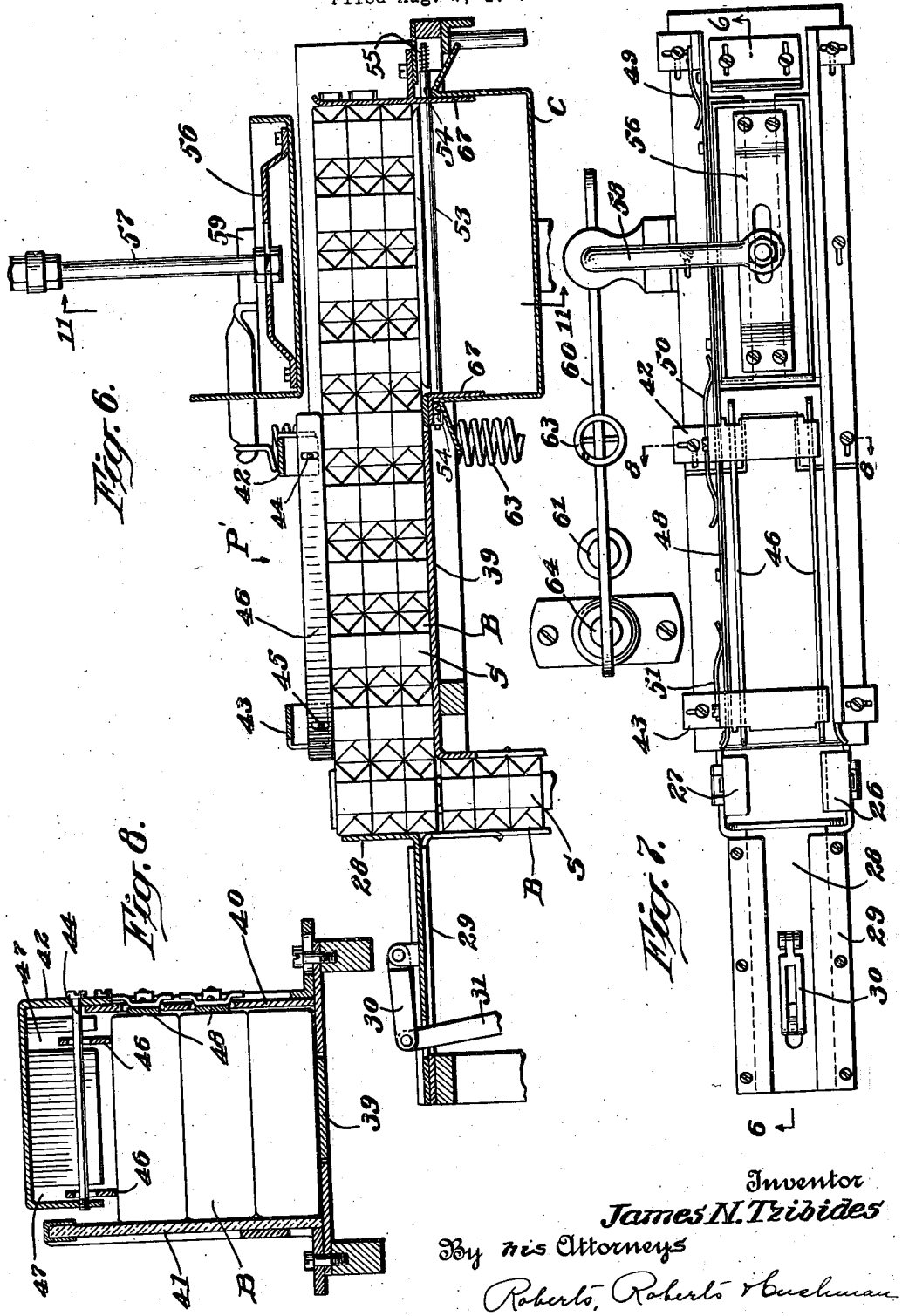

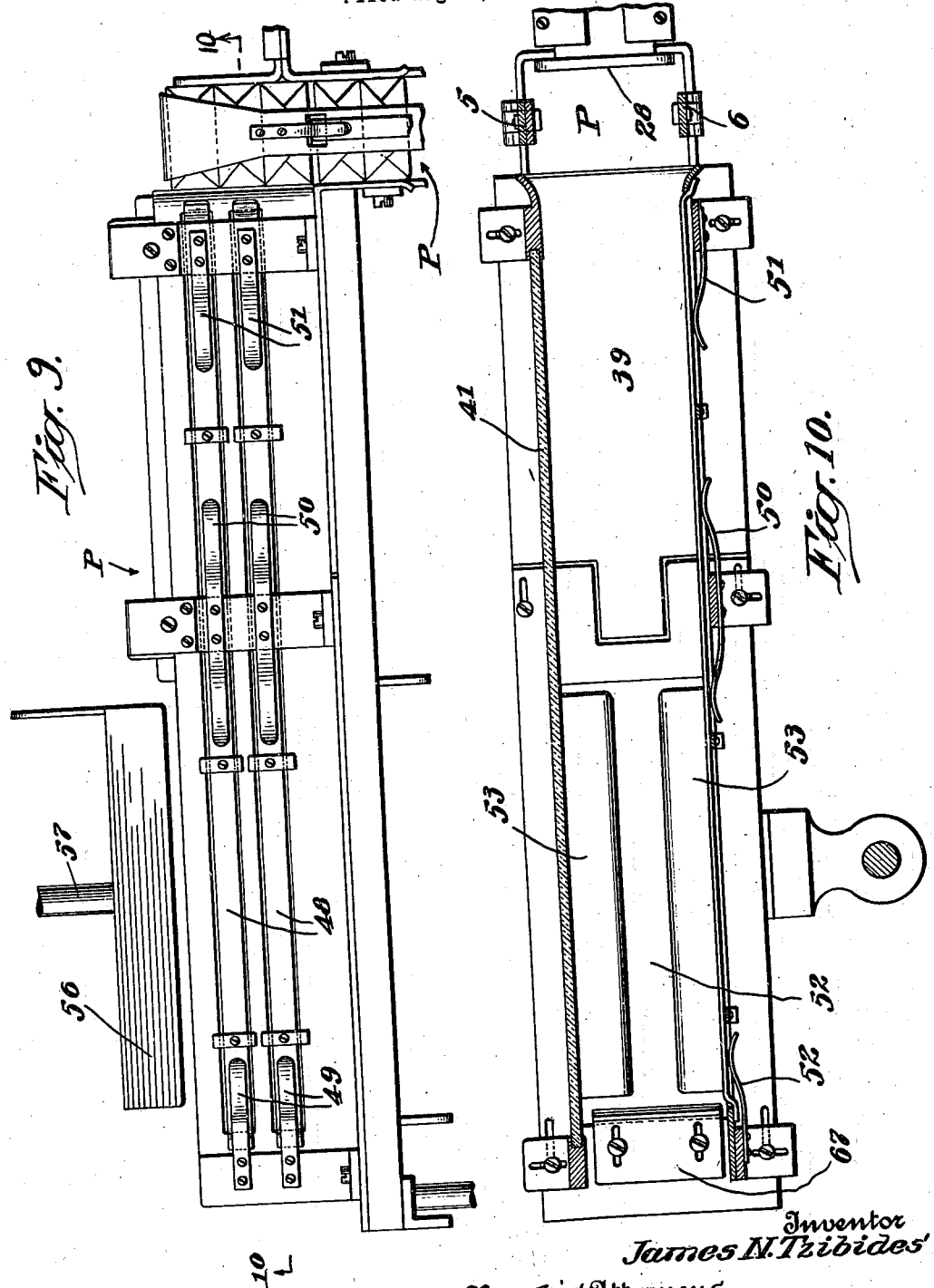

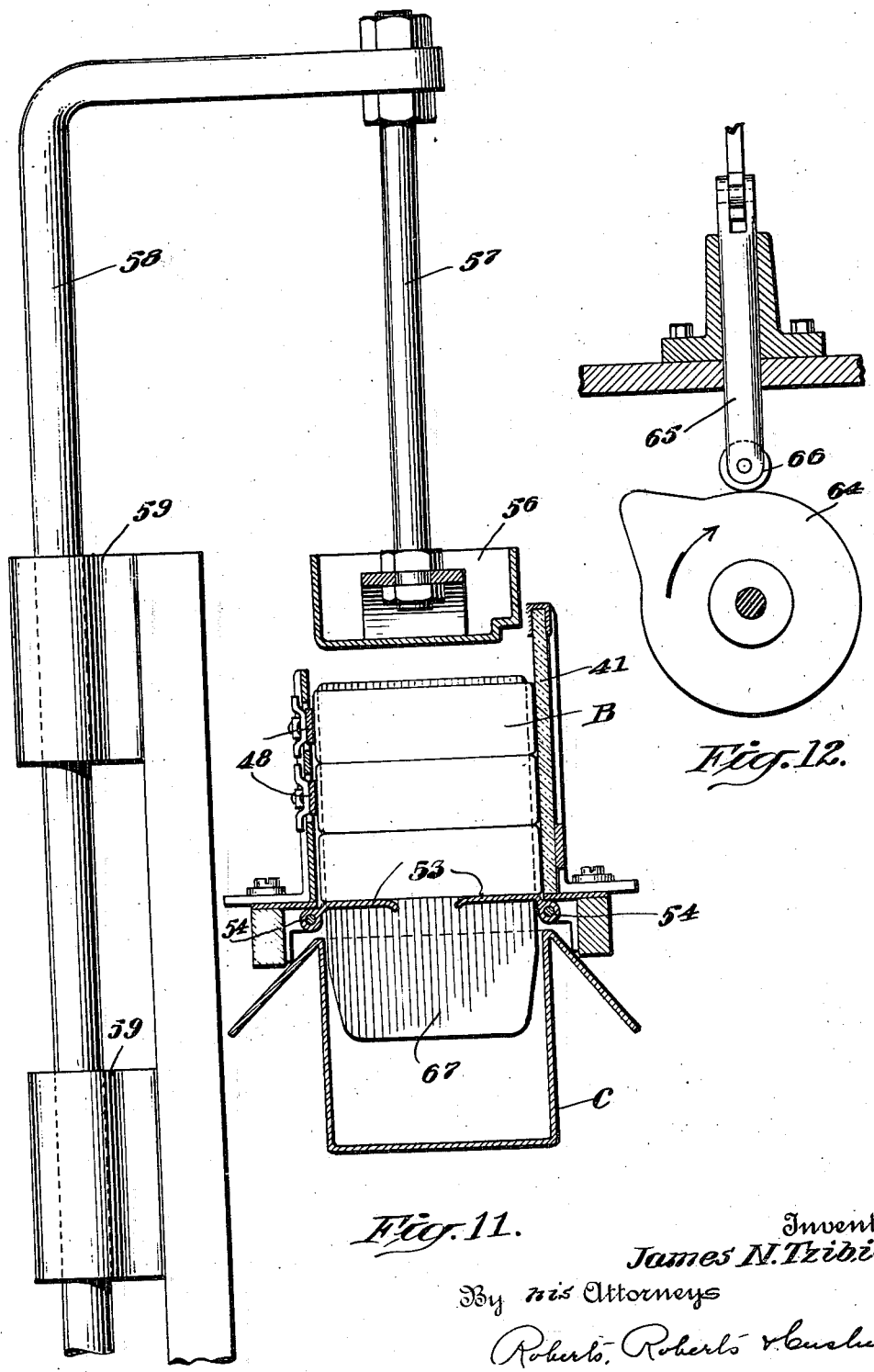

1,467,019

UNITED STATES PATENT OFFICE.

JAMES N. TZIBIDES, OF BROOKLYN, NEW YORK, ASSIGNOR TO R. J. REYNOLDS TOBACCO COMPANY, A CORPORATION OF NEW JERSEY.

MACHINE FOR HANDLING CIGARETTE PACKAGES OR THE LIKE.

Application filed August 2, 1920. Serial No. 400,691.

*To all whom it may concern:*

Be it known that I, JAMES N. TZIBIDES, a subject of Greece, and resident of Brooklyn, in the county of Kings and State of New York, have invented new and useful Improvements in Machines for Handling Cigarette Packages or the like, of which the following is a specification.

This invention relates to a machine for handling cigarette packages and more particularly to a machine for packaging cigarette packages in cartons after they have been freshly sealed with revenue stamps. The particular character of the cigarette packages which the machine is intended to handle are packages of the end-opening pouch type having projecting ends which are folded inwardly in the form of flaps over which the revenue stamp is glued or pasted to hold the end closed and also to seal the package according to revenue regulations. While the machine is primarily intended to package cigarette boxes or packages it is to be understood that in certain of its aspects the machine is adapted to handle other packages.

The objects of the invention are to provide rapid means for automatically placing cigarette packages or the like in cartons and more particularly to provide means adapted to handle freshly sealed packages the seals of which are likely to be detached in handling unless special means are provided. Other objects of the invention will be apparent from the following description of the preferred embodiment of the invention shown by way of illustration in the accompanying drawings, in which, Fig. 1 is a front elevation of the machine;

Fig. 1ª is an enlarged detail, viewed from the left of Fig. 1;

Fig. 2 is a vertical section on line 2—2 of Fig. 1, showing the mechanism in one position;

Fig. 3 is a similar view showing the mechanism in another position;

Fig. 4 is a horizontal section on line 4—4 of Fig. 3;

Fig. 5 is a vertical section on line 5—5 of Fig. 4;

Fig. 6 is a vertical section on line 6—6 of Fig. 7;

Fig. 7 is a top plan of the machine;

Fig. 8 is a vertical section on line 8—8 of Fig. 7;

Fig. 9 is a rear elevation of the upper part of the machine;

Fig. 10 is a horizontal section on line 10—10 of Fig. 9;

Fig. 11 is an enlarged section on line 11—11 of Fig. 6;

Fig. 12 is an enlarged section on line 12—12 of Fig. 1;

Fig. 13 is a front elevation of a modified form of the invention; and

Fig. 14 is a horizontal section on line 14—14 of Fig. 13.

The particular construction chosen for the purpose of illustration is intended to be used with a machine for applying revenue stamps to cigarette packages of the character referred to, the stamp affixing machine being described and claimed in my co-pending application Sr. No. 400,690 filed on even date herewith. However it is to be understood that the machine herein claimed may be used with other stamp affixing machines or independently of any stamp affixing machine.

Referring to Figs. 2, 3 and 4, a portion of the stamp affixing machine claimed in my aforesaid companion application is shown, comprising a belt conveyor 1 movable in the direction of the arrow in Fig. 3, and adapted to carry cigarette packages thereon as shown at B in Fig. 3. Mounted above the conveyer is a stamp affixer (not shown) adapted to apply the stamp S (Figs. 2 and 3) to the box B with the body of the stamp projecting forwardly (to the left in Figs. 2 and 3) beyond the open end of the package B. When the package reaches the left-hand end of the conveyer 1 it slides on to the elevator 2. After the box has been transferred to the elevator 2 the elevator rises from the lowermost position shown in Fig. 2 to the uppermost position shown in Fig. 3. As the elevator rises the end flaps of the package are closed and the stamp S is wiped downwardly over the closed end of the package as fully disclosed in my copending application. After the elevator reaches uppermost position the oscillatory pusher 3 slides the box from the elevator 2 onto the stationary table 4, the lower end of the stamp being wiped along the underneath side of the package as the package slides on to the table 4.

The packaging machine herein claimed comprises a vertical passageway P and a horizontal passageway P'. The passageway P comprises front and rear uprights 5 and 6 (Fig. 4) and side uprights 7 and 8, these uprights being adjustably mounted upon frame 9 of the machine at their lower ends and being suitably tied together above the frame by angle irons 10. The passageway P has a receiving opening 11 at the right-hand side at its lower end, in alinement with the table 4, so that packages may be slid into the lower end of the passageway horizontally from the table 4. At the lower end of the passageway an elevator 12 is arranged to oscillate upwardly and downwardly to lift each package after it is inserted into the passageway. The elevator 12 is arranged to slide vertically in the lower end of the passageway and is adapted to be actuated by an arm 13 mounted on a shaft 14 so as to engage a roller 15 on a depending lug of the elevator. The elevator 12 is held against the arm 13 by spring 16 and the arm 13 is connected through a series of shafts, links, and bell-cranks to the driving shaft of the machine so that the elevator 12 is raised recurrently at the same rate that the conveyor 1 and elevator 2 and pusher 3 supply packages thereto.

After the elevator 12 has risen to the uppermost position shown in Fig. 2 the pair of stops 17 pivoted at 18 are snapped inwardly by springs 19 into position to support the column of packages in passageway P while the elevator 12 is descending for another package.

In order to insure the lower end of the stamp S sticking to the lower side of the package while the elevator is bringing another package to bear against the bottom of the lowermost package a hook 20 pivoted at 21 and actuated by spring 22 is provided to engage the said end of the stamp and hold it in contact with the lowermost box (B' in Fig. 2). The hook 20 extends through an opening in the upright 7 and is adapted to be retracted when a new package is slid on to the elevator 12 as shown in Fig. 3, the upright 7 being pressed outwardly at the bottom to receive the end of the hook.

The horizontal passageway P' communicates with the vertical passageway P at the upper end of the right-hand side of the vertical passageway so that the uppermost packages in the vertical passageway may be moved horizontally into the horizontal passageway. In the particular embodiment chosen for the purpose of illustration the vertical passageway is adapted to have packages fed upwardly therealong in a single column while the horizontal passageway is shaped to receive the packages in column comprising three superposed rows, thus forming a multiple column having packages arranged in compact formation with rows extending both transversely and horizontally of the passageway. However it is to be understood that the number of rows in each column may be changed at will, the particular arrangement disclosed being chosen merely in view of the number of packages customarily placed in a carton at the present day.

A pair of stops 23 are pivoted at 24 to the uprights 7 and 8 near the upper end of the passageway P, these stops having hook-like ends projecting into the passageway through openings in the upright. The stops 23 are yieldingly held in innermost position by springs 25 and are adapted to be moved out of the passageway by the pressure of the packages when the elevator 12 rises. As shown in Fig. 2 the arms 23 are so positioned that they hook over the fourth package from the top when the elevator is in uppermost position or when the column is supported by the stops 17, the upper three packages in the column being shown in dotted lines in Fig. 2. Thus the stops 23 hold the packages therebeneath in a compact column, so that the freshly applied stamps are held in position; and they also space the upper three packages from the rest of the packages in the column so that when the upper three packages are pushed from the passageway P to the passageway P' the packages do not slide on each other. When the elevator 12 rises the arms 23 are forced apart by the package immediately therebeneath and when this package has passed the ends of the arms 23 they snap inwardly over the next package. In order to stop the packages at the upper end of the passageway P when in alinement with passageway P' stops in the form of flanges 26 and 27 are provided (Fig. 2), the stop 27 being shaped to engage the end of the stamp on the upper side of the package along a narrow edge disposed parallel with the path of movement of the packages, thereby to reduce the friction and to avoid sticking due to any glue that may possibly be exposed on the upper side of the package.

The packages are pushed three at a time from the passageway P to the passageway P' by means of a pusher 28 sliding horizontally in guide 29 and adapted to be actuated by the train of mechanism comprising link 30, bell crank 31, link 32, rod 33, arm 34, cam wheel 35, etc., the cam wheel 35 having four cams 36 spaced 90° apart and adapted to engage the cam roll 37 on the arm 34 which is pivoted at 38. The cam wheel 35 is rotated synchronously with the mechanism which actuates the conveyor 1, elevator 2, pusher 3, elevator 12, etc., at such a rate that the pusher 28 is advanced once for every three oscillations of the elevator 12, so that the packages are delivered from the passageway P at the same average rate that they are delivered thereto.

Referring to Sheets IV, V, VI, and VII the horizontal passageway P′ comprises a bottom 39 joined to the vertical passageway. The passageway is closed on the rear by wall 40 and on the front by glass 41 which permits the packages to be inspected in transit through the passageway to determine whether or not the stamps have been properly applied to all the packages before they are packaged. Mounted on the rear wall 40 are two supports 42 and 43 which overhang the passageway. The supports 42 and 43 have rods 44 and 45 adapted to support two presser bars 46 which are adapted to rest on the packages in the passageway P′ and hold the packages in compact relationship. The bars 46 are mounted on rods 44 by means of vertical slots which permit the bars automatically to adjust themselves to the vertical thickness of the column of the packages, the supports 42 and 43 having slots 47 adapted to position the bars lengthwise of the rods 44—45 (Fig. 8). Mounted in slots in the rear wall of the passageway P′ are presser bars 48 arranged to be yieldingly pressed inwardly against the ends of the packages by means of springs 49, 50, and 51, (Figs. 7, 8, 9 and 10). These presser bars not only hold the packages in exact alinement but they also serve to hold the freshly applied stamps against the ends of the boxes, the bars being automatically adjustable to the over-all lengths of the packages due to the springs 49, 50 and 51.

A delivery opening 52 is provided in the bottom of the passageway P′ at the end opposite the passageway P, this opening being long enough to permit four vertical rows of packages to be moved downwardly therethrough. The opening 52 is partially closed by a pair of doors 53 pivoted at 54 (Fig. 11) and yieldingly held closed by coil springs 55 (Fig. 6) on the shafts 54. The springs 55 are sufficiently strong to support twelve packages but they permit the doors to open readily when the twelve packages are pressed downwardly through the opening 52. The packages are pressed downwardly by means of a presser 56 mounted through the medium of a rod 57 on a slide 58 sliding in guides 59 on the frame of the machine. The presser 56 is pulled downwardly by means of a lever 60 (Fig. 1) pivoted to the frame at 61 and connected to the slide 58 through a pin and slot connection 62. The pusher 56 is held normally upwardly by means of a spring 63 acting on lever 60 and is periodically moved downwardly by means of a cam 64 (Fig. 12) acting through the rod 65 and cam roll 66, the cam 64 being timed to actuate the pusher 56 as soon as twelve packages have been advanced into position over the opening 52.

Depending lips 67 are provided at the opposite ends of the opening 52 to receive cartons C (Fig. 6) thereover. One of the lips 67 is adjustable as shown in Fig. 10 and both lips are preferably made of spring material so as yieldingly to support the carton. The travel of the pusher 56 may be so determined that the carton is automatically pushed off the lips after the twelve packages have been pushed thereinto.

The modification shown in Figs. 13 and 14 is adapted to be used independently of a stamp affixing machine for the purpose of packaging cigarette packages or the like. The horizontal passageway P″ corresponds to horizontal passageway P′ of the preferred embodiment above described but the vertical passageway P‴ differs from the vertical passageway P of the first embodiment in that the delivery opening is at the bottom and the receiving opening is at the top. A pair of arms 68, pivoted at 69, are arranged to clamp the fourth from the bottom package while the lower three packages are being moved from the vertical passageway P‴ to the horizontal passageway P″ by means of pusher 70. The arms 68 are normally held in retracted position by spring 71 and are adapted to be moved into clamping position by means of a cam 72 mounted on the pusher 70 by means of a bracket 73 so as to be moved to the right and thereby to spread the left-hand ends of the arms into clamping position when the slide is advanced, thereby supporting the column of packages above the lowermost three while the pusher 70 is being advanced and retracted.

In referring to the "sides" and "ends" of the cigarette packages these terms are not to be construed in the limited sense as defining the longer and shorter sides of the packages respectively, but are to be construed in the broader sense as connoting either the longer or shorter sides of the packages.

I claim:

1. A machine for handling cigarette packages or the like after a seal has been freshly applied over the end thereof comprising a passageway along which the packages may be fed in a column, a pusher for recurrently advancing the packages along the passageway, means synchronized with said pusher for inserting a new package into the passageway in advance of the pusher each time the pusher is retracted, and means for holding the portion of the freshly applied seal on the rear side of the rearmost package against the package while the pusher is being retracted and the new package is being inserted.

2. A machine for handling cigarette packages or the like after a seal has been freshly applied over the end thereof comprising a passageway along which the packages may be fed in a column, a pusher for recurrently advancing the packages along the passageway, means synchronized with said pusher for inserting a new package into the passageway in advance of the pusher each time the pusher is retracted, and a spring hook for holding the portion of the freshly applied seal on the rear side of the rearmost package against the package while the pusher is being retracted and the new package is being inserted.

3. A machine for handling cigarette packages or the like after a seal has been freshly applied over the end thereof comprising a passageway along which the packages may be fed in a column, a pusher for recurrently advancing the packages along the passageway, means synchronized with said pusher for inserting a new package into the passageway in advance of the pusher each time the pusher is retracted, and a spring hook for holding the portion of the freshly applied seal on the rear side of the rearmost package against the package while the pusher is being retracted and the new package is being inserted, said spring hook being arranged to be pushed out of operative position by the new package.

4. A machine for handling cigarette packages or the like after a seal has been freshly applied over the end thereof comprising a passageway along which the packages may be fed in a column, and means for advancing the packages along the passageway in a plurality of parallel rows with the sealed ends of the packages directed toward one side of the passageway, and a spring actuated presser bar for each row yieldingly to hold the seals in contact with the packages in transit along the passageway.

5. A machine for handling cigarette packages or the like after a seal has been freshly applied over the end thereof comprising a passageway along which the packages may be fed in a column, means for advancing the packages along the passageway with the sealed ends of the packages directed toward one side of the passageway, and means for yieldingly holding the seals in contact with the packages in transit along the passageway, the passageway being constructed and correlated with said holding means so that the sealed ends are visible in transit through the passageway, while the seals are being yieldingly held in contact with the packages.

6. A machine for handling cigarette packages or the like after a seal has been freshly applied over the ends thereof comprising a passageway along which the packages may be fed in a column, means for advancing the packages along the passageway with the sealed ends of the packages directed toward one end of the passageway, and means for yieldingly holding the seals in contact with the packages in transit along the passageway, said means including a transparent pressure plate engaging the seals, whereby the seals may be inspected while being yieldingly held in contact with the packages.

7. A machine for handling cigarette packages or the like comprising a horizontal passageway along which the packages may be fed in superposed rows, and presser bars above the passageway for holding the rows in compact relationship.

8. A machine for handling cigarette packages or the like comprising a horizontal passageway along which the packages may be fed in superposed rows, and presser bars above the passageway for holding the rows in compact relationship, said bars being free to move vertically to adjust themselves to the thickness of said rows.

9. A machine for handling cigarette packages or the like comprising a passageway along which packages may be fed in a column, and yielding means at the delivery end of the passageway for restraining the advance of the packages, in the rear thereof while permitting the removal of packages in advance thereof.

10. A machine for handling cigarette packages or the like comprising a passageway along which packages may be fed in a column, means for recurrently advancing the packages along the passageway a distance approximately equal to the dimension of a package longitudinal of the passageway and a spring actuated hook at the delivery end of the passageway arranged to hook over a package and restrain the advance of the packages to said distance, thereby to maintain the packages successively engaged by the hook in predetermined positions during the interims between the recurrent advances of the column, said hook being adapted to be retracted by the pressure of the column each time the column is advanced by said means.

11. A machine for handling cigarette packages or the like comprising a passageway along which packages may be fed in a column, said passageway having an opening at one side through which the packages may be delivered, and a stop adapted to be moved into said passageway immediately in advance of said opening to restrain the advance of the packages in the rear thereof while packages are being delivered through the opening.

12. A machine for handling cigarette packages or the like comprising a passageway along which packages may be fed in a column, said passageway having an opening at one side through which the packages may be delivered, and a stop adapted to be moved into said passageway immediately in advance of said opening to restrain the advance of the packages in the rear thereof while packages are being delivered through the opening, said stop being adapted to separate the packages to be delivered from the other packages in the column so as to facilitate the delivery of the packages through the opening.

13. A machine for handling cigarette packages or the like comprising a passageway along which packages may be fed in a column, said passageway having an opening at one side through which the packages may be delivered, and two spring actuated stops disposed on opposite sides of the passageway respectively immediately in advance of said opening to restrain the advance of the packages in the rear thereof while packages are being delivered through the opening.

14. A machine for handling cigarette packages or the like after a seal has been freshly applied over the end thereof comprising a passageway along which the packages may be fed in a column, said passageway having an opening at one side through which the packages may be delivered, and means at the delivery end of the passageway for stopping the packages in alinement with said opening, said means being adapted to engage the seal of the foremost package along a narrow edge parallel with the path of the packages in transit from the passageway through said delivery opening.

15. A machine for handling cigarette packages or the like comprising a passageway along which packages may be fed in a column, an opening through which packages may be delivered, a pair of opposed lips extending outwardly from the passageway at opposite sides of the opening, said lips being adapted to have an open carton slipped thereover and frictionally to hold the carton in position while packages are being moved from the passageway into the carton.

16. Package handling and arranging apparatus comprising means for advancing individual articles in a column, means for moving sections of the column, each consisting of a plurality of articles, laterally from the column and supporting a plurality of said sections in section-column arrangement, and means for moving a plurality of article sections from the section column to form a charge for a box or carton.

17. The same as claim 16 with the addition of: means for supporting a carton to receive the charge consisting of a plurality of rows of the articles.

18. Article handling and arranging mechanism comprising means for advancing articles such as cigarette packages horizontally, means for moving the packages successively into vertical column arrangement and for advancing the column, means for moving sections of the column, each consisting of a plurality of the packages, laterally, a support to receive successive sections in charge formation, and means for discharging simultaneously a plurality of said article sections constituting a carton charge.

19. The same as claim 18 with the addition of: means for supporting a carton to receive the charge.

Signed by me at Brooklyn, N. Y., this 27th day of July, 1920.

JAMES N. TZIBIDES.